United States Patent [19]
Straus

[11] Patent Number: 5,222,171
[45] Date of Patent: Jun. 22, 1993

[54] FUSED OPTICAL FIBER SPLICE ELEMENT

[76] Inventor: Jozef Straus, 691 Hillcrest Road, Ottawa, Ontario, Canada, K2A 2N2

[21] Appl. No.: 779,849

[22] Filed: Oct. 21, 1991

[51] Int. Cl.$^5$ .............................. B02B 6/255
[52] U.S. Cl. ........................ 385/96; 385/97; 385/98; 385/99
[58] Field of Search ................. 385/96, 97, 98, 99

[56] References Cited

U.S. PATENT DOCUMENTS

| | | | |
|---|---|---|---|
| 4,509,820 | 4/1985 | Murata et al. | 385/98 |
| 4,598,974 | 7/1986 | Munn et al. | 385/96 |
| 4,746,189 | 5/1988 | Arrington et al. | 385/97 |
| 4,798,431 | 1/1989 | Clark et al. | 385/60 |
| 4,940,307 | 7/1990 | Aberson et al. | 385/98 |
| 4,957,343 | 9/1990 | Sato et al. | 385/96 |
| 4,964,689 | 10/1990 | Wichansky | 385/56 |
| 5,046,812 | 9/1991 | Yanagi et al. | 385/96 |

Primary Examiner—Frank Gonzalez
Attorney, Agent, or Firm—S. T. Jelly

[57] ABSTRACT

Opposed ends of optical fibers are fused within a holding member, by heating the fiber ends by means positioned in, or on, the member. A self-contained package can be provided to which an electric current is applied, or some other heating method.

15 Claims, 3 Drawing Sheets

FUSED OPTICAL FIBER SPLICE ELEMENT

This invention relates to fused optical fiber splice elements and in particular to such elements which are readily used under field and similar conditions.

Optical fibers are connected generally in two ways. In one example the ends of a pair of optical fibers are positioned in abutting relationship in a member, which aligns the fibers. The member may have a central hole accurately produced to hold the fibers aligned, or a plurality of rod-like elements act to hold the fibers aligned. The fibers are retained in the member by some form of adhesive. An index matching fluid can be positioned between the ends of the fibers to reduce losses.

In another example, the ends of the fibers are positioned in end to end alignment and an electric arc is developed between electrodes positioned on either side of the proposed join. The arc causes the ends of the fibers to fuse.

Fusing the fibers produces a very high quality joint or connection but is difficult to produce in the field. Fusion machines are used with quite complex holding means for the fibers, to provide very accurate alignment. Such machines are expensive, complicated, susceptible to damage and require reasonably skilled operators.

Therefore, when the conditions under which connections are to be made are other than well controlled conditions, the use of mechanical splices in which the fibers are connected by positioning in holding members by an adhesive are widely used, even though higher losses usually occur.

The present invention provides for the connection of optical fibers which has the advantages of both systems. Broadly, a splice element for fusion splicing a pair of optical fibers end-to-end, in accordance with the invention, comprises a holding member having axial alignment means for the fibers, and means for heating the opposed ends of the fibers while positioned in the holding member to fuse the fibers together. The axial alignment may be obtained in various ways. For example the fibers may be positioned in Vee-shaped grooves, and some form of clamping means can be provided. Another way is to position the fibers in a bore having a close fit on the fibers. Yet another way is to provide a plurality of rod-like elements, usually three, positioned in parallel relationship in the holding member. Such alignment ways, and others, are conventional in other forms of fusion and mechanical splices.

The means for heating the opposed ends of the fibers can vary. One example is two opposed electrodes positioned at the abutment position of the fiber ends. Application of a high frequency current produces an arc between the electrodes, fusing the fiber ends. Electrodes can be positioned in the holding member at the abutment position.

Another example is the provision of a heating element in the holding member at the abutment position. The element will produce a temperature high enough to fuse the fibers. It may only operate once and can therefore be a one shot heater which may destruct on heating. Other ways of producing a high temperature localized heating can be used, such as a gas flame.

The invention also includes a method of fusing together opposed abutting ends of a pair of optical fibers, in which the ends of the fibers are inserted in alignment in a holding member and the ends of the fibers heated to fuse them together.

The invention will be readily understood by the following descriptions of certain embodiments, by way of example, in conjunction with the accompanying drawings, in which.

Figure 1:
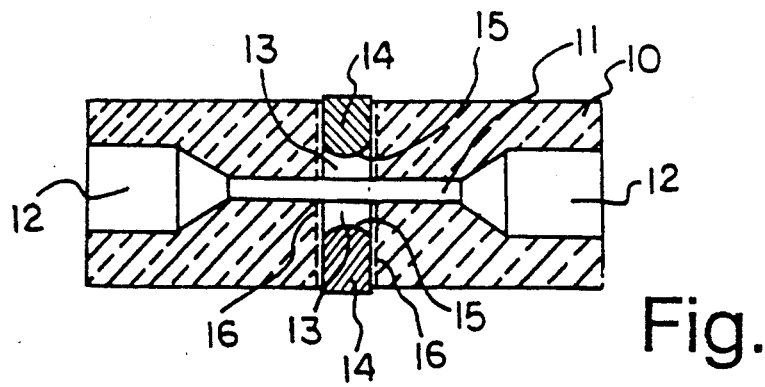
FIG. 1 is a longitudinal cross-section through one form of holding member for a splice element.

As illustrated in FIG. 1, a splice element comprises a holding member in the form of a tubular member 10 which has an axial bore 11, with enlarged end bore sections 12. The bore 11 is dimensioned to be a close fit on the uncoated ends of fibers to be joined or spliced. The sections 12 are a close fit on coated portions of the fibers. At a mid point of the bore 11 there are two diametrically opposed apertures 13 in which are positioned electrodes 14. The electrodes have rounded inner ends 15.

The construction of the holding member can vary. Thus it can be of fused quartz glass, or similar. Alternatively it can be of stainless steel, in which case some form of insulating layer, indicated in dotted outline at 16, will be required between the electrodes and the holding member. As a further alternative, the holding member can be of ceramic, or other insulating material. While shown as being of unitary form, the holding member can be of a plurality of parts assembled together.

Figure 2:
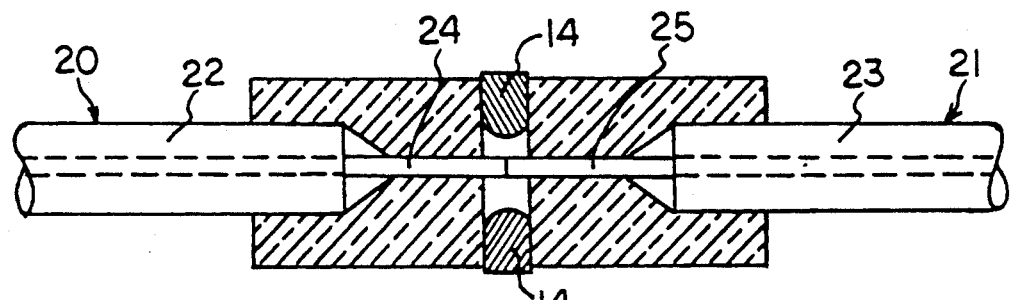
FIG. 2 is a view similar to that of FIG. 1, showing fibers in position.

In FIG. 2 two optical fibers, 20 and 21 are shown positioned in the holding member. The fibers have the coating 22, 23 removed for a short distance and the fiber cores 24, 25 are cleaved, or otherwise formed at their ends to provide flat end surfaces. The end surfaces abut. The coated portions of the fibers are positioned in the sections 12 and can be retained therein by an adhesive.

Figure 3:
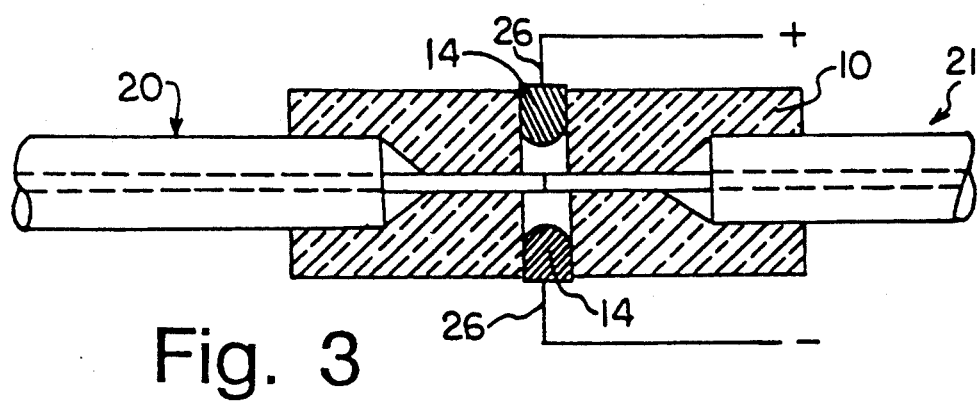
FIG. 3 illustrates the fusing step for the splice element as in FIG. 2.

When the fibers 20 and 21 are positioned in the holding member, a high frequency current is applied to the electrodes 14, as illustrated in FIG. 3, at 26. A convenient way of connecting the electrical supply to the electrodes would be a sleeve which is a close fit on the outside of the member 10 with spring loaded contacts for contacting the electrodes 14. The sleeve could be split, hinged, to provide for easy positioning. When the current is switched on an arc will be formed between the electrodes 14, and the ends of the fibers fused together. The power supply 26 can be from a central system which controls voltage, amperage and time, or any combination of these, and other, items.

Figure 4:
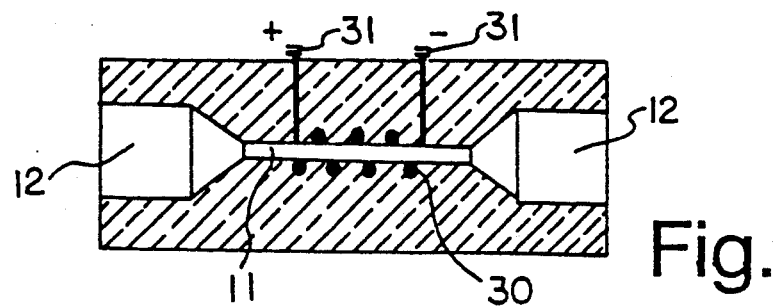
FIG. 4 is a cross-section similar to that of FIG. 1, illustrating an alternative form of holding member.

FIG. 4 illustrates an alternative form of holding member, common reference numerals being used where applicable. In this example, an electric resistance heater 30 is positioned around the abutment position of the fiber ends. The heater 30 can be of various forms, and as an example can be a carbon heater which disrupts once it has heated. If the member 10 is electrically conducting then some insulation will be required between the heater and the tubular member. The electrical supply is indicated at 31 and can be controlled as for FIG. 3.

Figure 5:
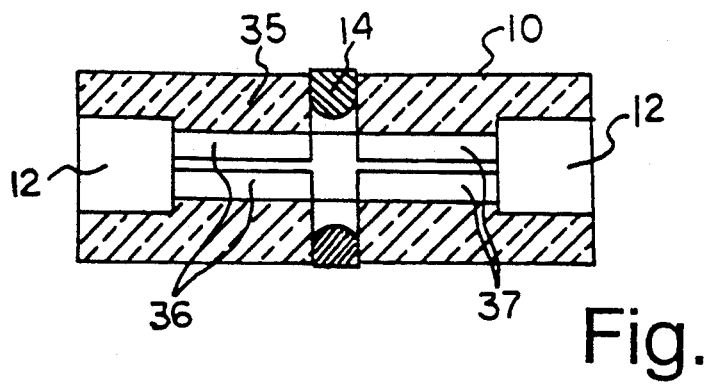
FIG. 5 is a longitudinal cross-section on the line 5—5 of FIG. 6, illustrating a further alternative form of holding member.
Figure 6:
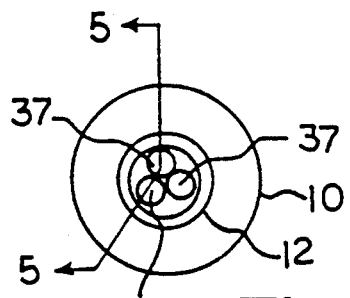
FIG. 6 is an end view of the holding member of FIG. 5, in the direction of arrow A in FIG. 5.

In FIGS. 5 and 6 a further form of splice element is illustrated, again common reference numerals being used where applicable. In this form, instead of a small bore 11, a larger bore 35 is formed. Sections 12 are also provided. Positioned in the bore 35 are a plurality of rod-like elements 36 and 37, in the example three at each end of the bore 35. A gap 38 is provided between opposed ends of the elements 36 and 37. The rod-like elements 36 and 37 define a central bore which is a close sliding fit on the fiber ends. Opposed electrodes 14 are provided.

FIGS. 1 to 6 illustrate, rather diagrammatically the basic features and precepts of the invention, and the form of the holding member can be varied considerably as can other features.

Thus, for example, the holding member can be an elongate member, for example of rectangular cross-section, having a Vee-shaped groove in one surface. The fiber ends rest in the groove. Some form of holding or clamping means can be provided to hold the fibers in position. Generally the Vee groove will be interrupted by an enlarged groove or other form, to provide some clearance around the ends of the fibers. Generally, but not necessarily, a cover will be positioned over the fibers. The transverse bore 13 provides such a clearance in FIGS. 1 to 6. Also in the embodiments of FIGS. 1 to 6 the transverse bore can be of some other form than parallel sided. It may taper outwards towards the axis of the holding member and may have an increased diameter portion at its center portion.

Figure 7:
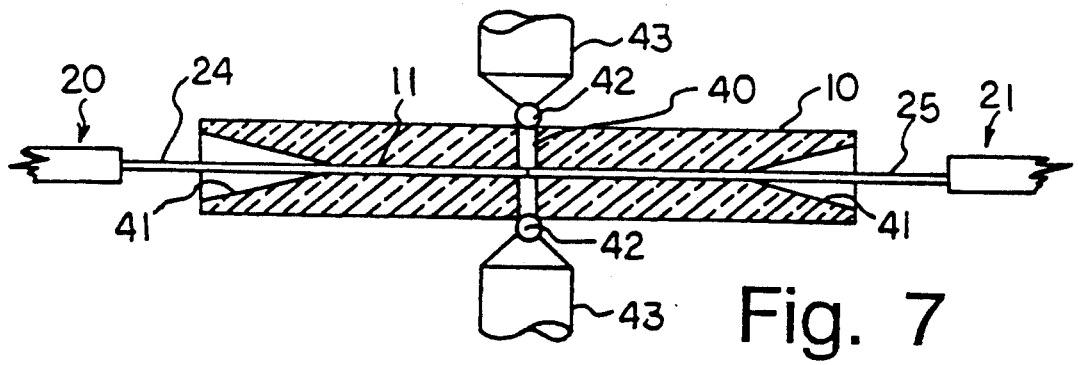
FIG. 7 is a longitudinal cross-section through a particular embodiment.

FIG. 7 illustrates a particular embodiment, using common references where applicable, comprising a glass, for example fused quartz tubular member 10, which, in this example, has a central bore 11 for the positioning of the unclad portions 24 and 25 of optical fibers 20 and 21. A typical outside diameter of the member 10 is 1.8 mm, but this can vary. A transverse bore 40 is formed at the position where the fiber ends are to be fused. A typical dimension for bore 40 is 0.5 mm but again this can vary. Preferably the wall of the bore 40 is polished. Bore 11 has tapered ends 41 for ease of entry of the fibers.

In a particular usage, fiber 24 is installed into the bore 11 with its cleaved end in the center of bore 40, and held in position. Fiber 25 is attached to a positioning stage to allow feeding in to a butting position of the fiber ends.

A ball 42 is positioned at each end of the transverse bore 40 and the electrodes 43 from a DC power source applied to the balls. A typical source of high voltage DC is that from a conventional fusion splicer, but can readily be provided by other sources. As an example, heating by creating an arc between the balls, was carried out in three stages. The first heating was for 40 seconds at a current of 20 amps at a voltage of about 5 Kv. With an original datum loss in one of the fibers of 3.4 dBm, after the first heating the loss across the splice was 5.6 dBm, indication of limited fusion. A second heating of 50 seconds at a current of 40 amps, at the same voltage gave a loss of 5.1 dBm, still showing limited fusion. At a third heating for 50 seconds at a current of 70 amps, at the same voltage the loss was 3.8 dBm showing satisfactory fusion. It was noted that one of the balls of this third heating became very hot. Thus it is seen that the arrangement as illustrated in FIG. 7 will provide a one-shot fusion splice using an approximate heating cycle of 50 seconds at 70 amps and about 5 Kv volts.

Conveniently, either the balls can be separate items applied at the time fusion is to occur, or can be supplied in place, held by a suitable adhesive or some mechanical means. Other forms than balls could be used.

For a complete "package", the holding member would extend at each end and have a bore within which would be fixed the protective coating.

Figure 8:
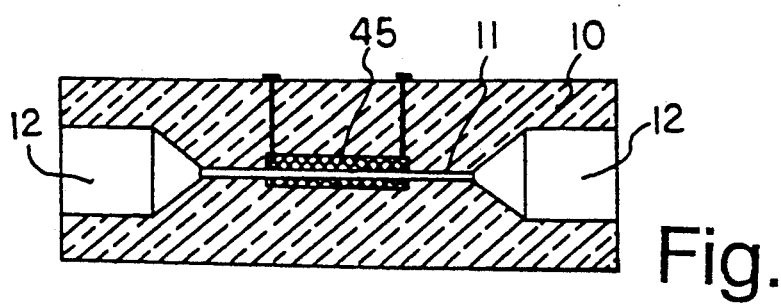
FIG. 8 is a cross-section similar to that of FIG. 4, illustrating a modification.

FIG. 8 illustrates an arrangement similar to that of FIG. 4, in which a tubular carbon resistor member 45 is used. On application of an electric current, the resistor member 45 will heat, fusing the fiber and itself disintegrating.

Figure 9:
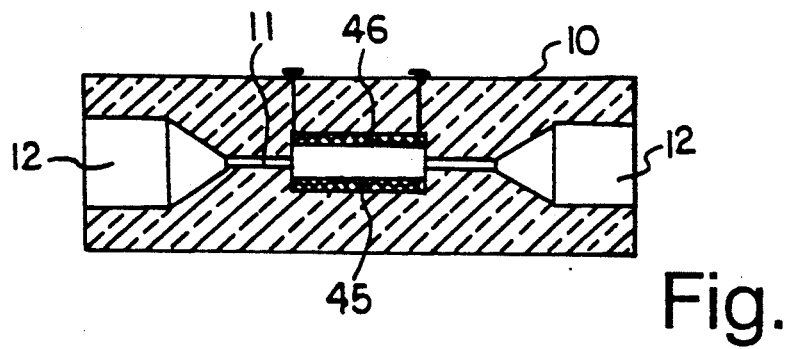
FIG. 9 illustrates a modification of the holding member in FIG. 8.

FIG. 9 illustrates the provision of some clearance around the ends of the fibers. The member 10 is recessed, at 46, the resistor member 45 being positioned in the recess, allowing some clearance around the fiber ends.

Figure 10:
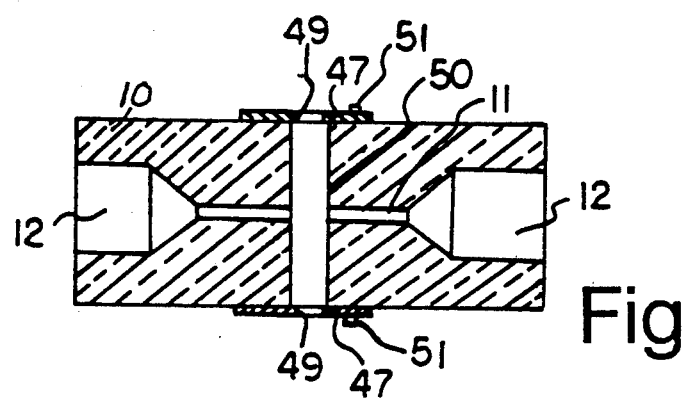
FIG. 10 is a longitudinal cross-section of a further embodiment.

In FIG. 10, instead of producing the arc between electrodes as in FIGS. 1 to 6, or balls as in FIG. 7, two pieces of metal 47 are attached, for example by an adhesive, and act as electrodes on either side of the member 10. Each piece of metal has a hole 49 and a transverse hole 50 is formed in the member 10. Application of electric current, for example at 51, produces an arc from the edges of the holes, which fuses the fiber ends.

Figure 12:
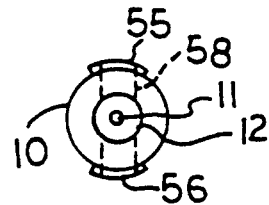
FIG. 12 is an end view of the embodiment of FIG. 11.
Figure 11:
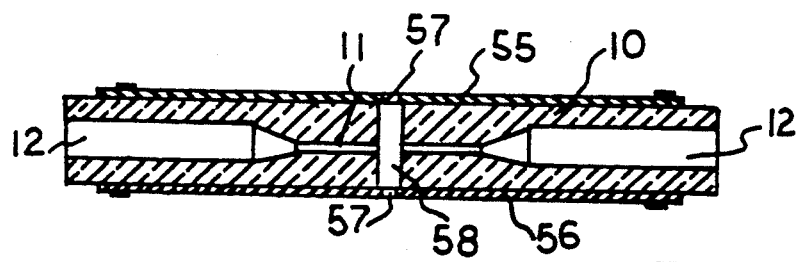
FIG. 11 is a longitudinal cross-section of yet another embodiment.

FIGS. 11 and 12 illustrate a modification of the embodiment of FIG. 10. FIGS. 11 and 12 illustrate what would be termed a "package" device in which the member 10 is long enough to enable the outer protective coatings of the fibers to be attached. Extending along the member 10, on either side, are elongate strips of metal 55 and 56. These strips are attached, for example, by an adhesive. Each strip has a hole 57 and a transverse hole 58 extends through the member 10. The protective coating fits in the bore section 12, as in FIGS. 1 to 9. The bores 12 can be given a lining coat of a heat sensitive adhesive. Once the fibers have been inserted, with the ends abutting, or closely spaced, at the position of the bore 58, an electric current is applied to the strips 55 and 56. An arc is produced from the edges of the holes 57 to fuse the fibers. Current can then be passed through each strip to heat it up and cause the heat sensitive adhesive to bond the protective coatings of the surfaces of the bores 12.

A further alternative, comprises a ceramic tube which surrounds the fiber end, similar to the carbon tube in FIG. 8. In addition means are provided for producing an RF field across the splice region. First, electric current is applied to the ceramic tube which heats up. Then the RF field is switched on to increase the heating effect and cause fusing of the fiber ends.

As stated previously, the embodiments described, and illustrated, have used a tubular member as a holding member, but the actual form of holding member can vary, as can also the alignment means. The holding member can have separate parts assembled together. The objective is to provide some form of holding member in which two fibers can be held in axial alignment, with provision of means for heating the fiber ends for fusion of the fiber ends, in the holding member, the fused fibers remaining in the holding member, rather than being transferred to a further member after fusion.

While in the examples described, fusion has been obtained by generating heat by use of an electric current, for example to form an arc or to heat a resistor, it is possible to create the fusion heating in other ways. For example, in a connector as in FIG. 8, the carbon resistor can be replaced by a combustible material, for example powdered magnesium. This could be ignited by the internal application of heat. It could also be ignited by an electric current. A further alternative is a gas flame. For example, in the embodiments of FIGS. 1 to 3, FIG. 5, FIG. 7 and FIGS. 9 and 10, a flame could be directed through the transverse bore to fuse the fiber ends.

It can be of advantage to provide a two-stage fusion. In the first stage a lower power level arc or other heating, is produced to obtain some rounding of the fiber ends, or other advantage. In the second stage a higher power level arc or other heating is produced to fuse the fiber ends. Also some means may be provided for moving the fiber ends together at fusion. This can be provided by some form of clamping which develops a limited amount of end thrust, or some simple means for pushing the fibers, or one of the fibers, can be provided. Such end movement is used in conventional fusion splicing and mechanical splicing connections.

While described, and illustrated, as single units, multiple units can be provided for the connection of more than one pair of fibers.

What is claimed is:

1. A splice element for the fusing of opposed ends of a pair of optical fibers, comprising a holding member having axial alignment means, for alignment of opposed ends of a pair of optical fibers, said splice element including means for applying heat to said opposed ends to fuse them at an intermediate position in said bore, and including an enlarged bore at each end for reception of a protective coated portion of a fiber.

2. A splice element as claimed in claim 1, said axial alignment means comprising means defining a bore for reception of said opposed ends of said fibers.

3. A splice element as claimed in claim 1, including a transverse bore in said holding member at said intermediate position.

4. A splice element as claimed in claim 3, including spaced electrodes positioned at said transverse bore, for formation of an arc in said transverse bore.

5. A splice element as claimed in claim 4, said spaced electrodes positioned in said transverse bore.

6. A splice element as claimed in claim 4, said spaced electrodes positioned at outer ends of said transverse bore.

7. A splice element as claimed in claim 1, including a heating means adjacent to said opposed ends, at said intermediate position.

8. A splice element as claimed in claim 7, said heating means comprising an electric resistor heater.

9. A splice element as claimed in claim 8, said electric resistor heater comprising a tubular carbon member.

10. A splice element as claimed in claim 3, including a metal strip electrode on an outer circumference of said holding member at each end of said transverse bore, each strip including a hole aligned with said transverse bore, whereby an arc can be formed between said strips.

11. A splice element as claimed in claim 3, including a metal strip extending along each side of said holding member on an outer surface thereof, and a bore in each metal strip aligned with said transverse bore for production of an arch through said transverse hole.

12. A splice element as claimed in claim 11, including a layer of heat activated adhesive in each enlarged bore, heating of said metal strips actuating said adhesive.

13. A splice element as claimed in claim 2, said means defining said bore comprising a plurality of rod-like elements positioned side by side in said holding member.

14. A method of fusing opposed ends of a pair of optical fibers comprising positioning said ends at an intermediate position in a holding member, retaining said ends in alignment in said holding member and producing heating at said intermediate position to fuse said opposed ends, and activating a heating member in said tubular member.

15. A method as claimed in claim 14, said heating member comprising an electric resistor.

* * * * *